United States Patent
Xu et al.

(10) Patent No.: US 7,894,440 B2
(45) Date of Patent: Feb. 22, 2011

(54) PROGRAMMABLE HASH-TUPLE GENERATION WITH PARALLEL RULE IMPLEMENTATION INDEPENDENCE

(75) Inventors: Kun Xu, Austin, TX (US); David Kramer, Cedar Park, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 190 days.

(21) Appl. No.: 12/404,140

(22) Filed: Mar. 13, 2009

(65) Prior Publication Data

US 2010/0232434 A1    Sep. 16, 2010

(51) Int. Cl.
*H04L 12/56* (2006.01)
(52) U.S. Cl. .................................. 370/392; 709/223
(58) Field of Classification Search .............. 370/352, 370/395, 360, 252, 230, 392; 709/223
See application file for complete search history.

(56) References Cited

U.S. PATENT DOCUMENTS

| | | | |
|---|---|---|---|
| 5,860,070 A | 1/1999 | Tow et al. | |
| 6,738,355 B1 * | 5/2004 | Love et al. | 370/252 |
| 7,328,349 B2 * | 2/2008 | Milliken | 713/181 |
| 7,359,380 B1 | 4/2008 | Maufer et al. | |
| 7,366,092 B2 | 4/2008 | Moll et al. | |
| 7,403,542 B1 | 7/2008 | Thompson | |
| 7,441,022 B1 * | 10/2008 | Schuba et al. | 709/223 |
| 7,573,868 B2 * | 8/2009 | Cutler et al. | 370/352 |
| 7,610,330 B1 | 10/2009 | Quinn et al. | |
| 7,633,944 B1 * | 12/2009 | Chang et al. | 370/392 |
| 2004/0103291 A1 | 5/2004 | Craft | |
| 2005/0036482 A1 * | 2/2005 | Goroshevsky et al. | 370/352 |
| 2006/0072582 A1 * | 4/2006 | Bronnimann et al. | 370/395.32 |
| 2007/0110044 A1 * | 5/2007 | Barnes et al. | 370/360 |
| 2008/0062870 A1 * | 3/2008 | Clower et al. | 370/230 |

OTHER PUBLICATIONS

Office Action in U.S. Appl. No. 12/418,259, dated Dec. 8, 2010, pp. 14.

* cited by examiner

*Primary Examiner*—Thong H Vu
(74) *Attorney, Agent, or Firm*—Zagorin O'Brien Graham LLP (57) ABSTRACT

Techniques have been developed to facilitate concurrent evaluation of hash rule entries in ways that allow an implementation to maintain a deterministic resultant hash irrespective of variations in the allocation of particular rules to particular storage banks or evaluation logic, such as may occur with rule set revisions. Similarly, uniform deterministic hash results can be assured even across a range of implementations that support greater or lesser levels of concurrent rule evaluations.

20 Claims, 6 Drawing Sheets

PROGRAMMABLE HASH-TUPLE GENERATION WITH PARALLEL RULE IMPLEMENTATION INDEPENDENCE

BACKGROUND

1. Field

This disclosure relates generally to data processing systems, and more specifically, to computationally efficient mechanisms for calculating a hash over information that is evaluated, at least partially, in a piecewise manner.

2. Related Art

Modern packet-routed communications involve the use of numerous specialized hardware and software techniques to parse packet header information and to direct flows of related packet information based on the header information parsed. In some cases, it can be desirable to calculate a hash over at least a portion of the information parsed from individual packet headers so as to deterministically distribute computations or flows in a way that maintains locality with respect to some aspect of the hashed over information. For example, hashes are commonly used in packet routing implementations that seek to achieve load balance by distributing packets over a range of processing queues, targets or other resources.

Processing speed can be an important figure of merit for many packet routing techniques and implementations. While processing techniques that seek to decompose packet header processing into steps that can be executed concurrently can enhance throughput and/or reduce latency, such decompositions may not mesh particularly well with a design requirement to deterministically calculate a hash over information coded in the packet header fields so processed. These challenges may be particularly acute when the processing is defined using a flexible, programmatically defined chain of filtering rules for which it is desirable to maintain determinism irrespective of evaluation order and/or allocation of decomposed computational steps to functional blocks.

Computationally efficient techniques are desired to facilitate deterministic hash generation and concurrent evaluation of packet header field filtering rules.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Techniques have been developed to facilitate concurrent evaluation of hash rule entries in ways that allow an implementation to maintain a deterministic resultant hash irrespective of variations in the allocation of particular rules to particular storage banks or evaluation logic, such as may occur with rule set revisions. Similarly, uniform deterministic hash results can be assured even across a range of implementations that support greater or lesser levels of concurrent rule evaluations.

Systems Realizations, Generally

Figure 1:
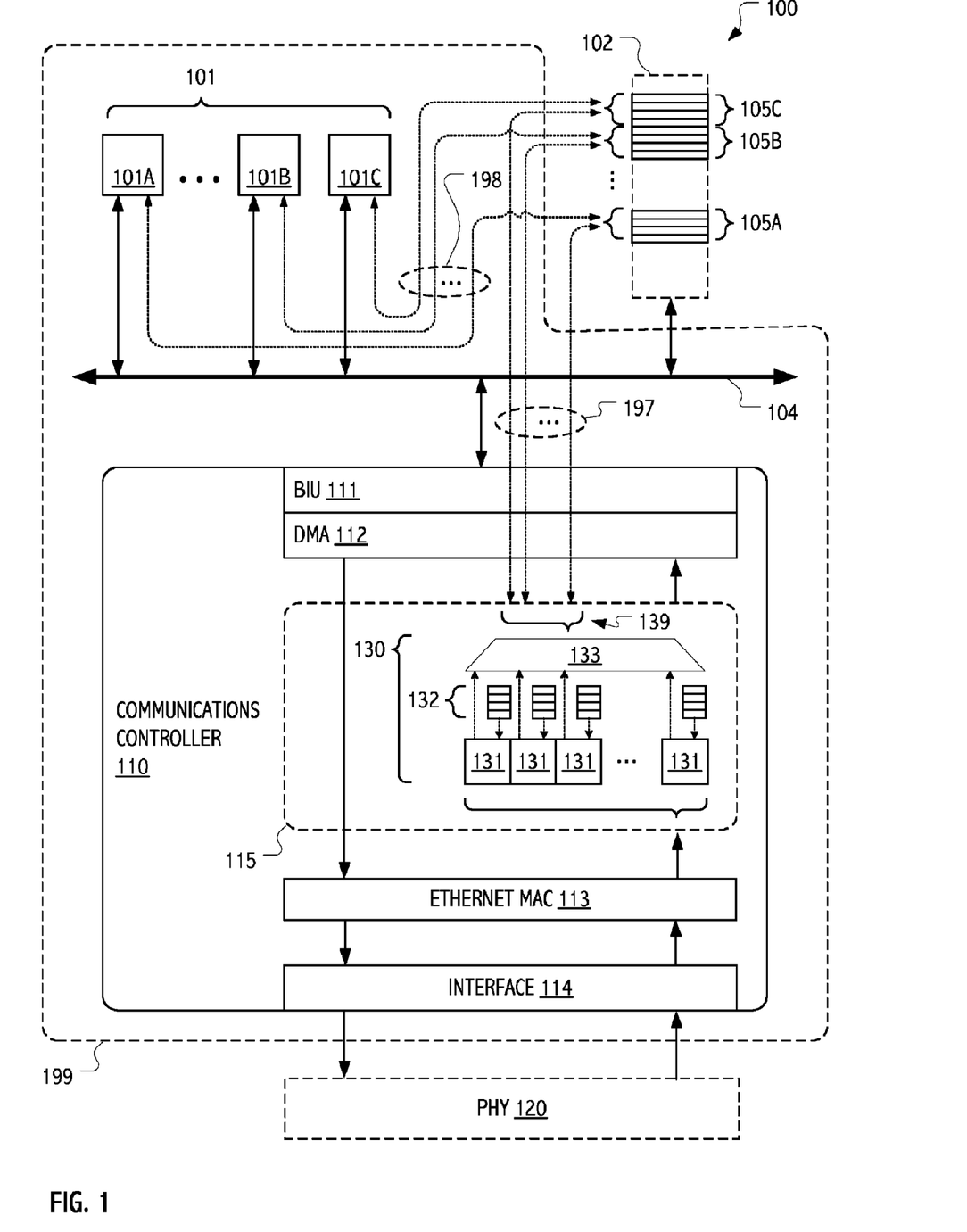
FIG. 1 is a block diagram illustrating a communications controller configuration in which a core-affinity preserving distribution of packet traffic is achieved using techniques in accordance with some embodiments of the present invention.

FIG. 1 is a block diagram illustrating a computational system 100 in which a communications controller 110 facilitates a core-affinity preserving distribution of packet traffic using hash generation techniques in accordance with some embodiments of the present invention. In the illustrated configuration, communications controller 110 is coupled between a physical layer (PHY) block 120 of a communications architecture and the processor(s) 101 and memory 102 of computational system 100.

FIG. 1 illustrates a simple illustrative configuration in which a bus-type interconnect 104 couples processors 101, communications controller 110 and addressable storage presented as memory 102. Data transfers between communications controller 110 and memory 102 are facilitated using DMA interface 112 and bus interface unit 111. Nonetheless, persons of ordinary skill in the art will appreciate that any of a variety of interconnect topologies, memory hierarchies and I/O interfaces may be employed in other embodiments. In this regard, the illustration of FIG. 1 is not meant to be limiting but to rather serve as a useful descriptive context in which certain inventive concepts will be understood. In other embodiments, modern front-side multi-path interconnect fabrics that support concurrent non-conflicting transactions and high data rates may be employed together with multiple tiers of interconnects including specialized I/O interconnects and suitable bridging and coherence technologies. Based on the description herein, persons of ordinary skill in the art will appreciate suitable implementations in, and adaptations for, more or less complex computational systems.

In general, embodiments of communications controller 110 may implement any of a variety of channel access mechanisms, information frames and headers. Nonetheless, for concreteness of description, illustrations herein tend to focus on traffic and terminology typical of Ethernet-type data link layer implementations. Accordingly, for purposes of illustration and in accord with OSI model nomenclature, the embodiment of FIG. 1 includes an Ethernet media access control (MAC) block 113 that interfaces with PHY block 120. In general, suitable MAC and PHY implementations are well known in the art and Ethernet MAC 113 and PHY 120 are of any suitable design.

As is typical, Ethernet MAC 113 operates on information frames sometimes referred to as packets, which typically encode both header information and a body or data portion. For example, information frames received at a block such as Ethernet MAC 113 and typically encode source and destination MAC-level physical address fields, e.g., MAC_SA and MAC_DA fields, together with an EtherType field that identifies the type (e.g., Internet protocol version 4 [IPv4], address resolution protocol [ARP], Novell IPX, IPv6, etc.) of data conveyed. Encapsulated within the MAC-level body of a received information frame (or packet) are further headers and associated data portions. For example, internet protocol traffic includes its own headers which encode, amongst other fields, IP-level source and destination addresses, e.g., as IPSA and IPDA fields and a protocol, e.g., as a PROT field, that identifies the associated IP-level data portion as Internet message control protocol [ICMP] data, transmission control protocol [TCP] data, user datagram protocol [UDP] data, etc.). Encapsulated data portions can be characterized by further headers and data portions. For example, further encapsulated within TCP protocol data (sometimes referred to as a TCP segment) are additional headers and associated data. Such TCP segments conventionally encode (amongst other things) source and destination ports, e.g., as SP and DP fields, together with an associated data portion.

Persons of ordinary skill in the art will appreciate that, in general, received information frames include, typically at successive levels of encapsulation, numerous header field values that may be parsed from respective headers and thereby inform packet routing, decisioning and processing at data link and further layers in an information processing architecture. In particular, for purposes of illustrating some embodiments, it will be apparent that, for an IPv4 packet that conveys TCP traffic, an illustrative subset of such fields includes MAC_SA, MAC_DA, EtherType, IPSA, IPDA, PROT, SP and DP fields parsable from respective MAC-, IP- and TCP-level headers. Field lengths, offsets and type indications for successively encapsulated header and data are typically the subject of agreed or de facto standards and, in any case, techniques for reliably parsing field values from such headers and associated data are well understood in the art. Thus, for clarity of description, header fields and operations thereon (such as match rule evaluations and hash computations) are discussed in the material that follows without particular regard to the levels in successively encapsulated information codings at which any given header field appears.

In some embodiments, a substantial portion of a computational system such as that illustrated in FIG. 1 is implemented as a system on a chip (SoC) and embodied as a single integrated circuit chip 199. In such configurations, some storage of a memory hierarchy (e.g., a portion of a hierarchy illustrated collectively as memory 102) and/or a subset of blocks such as PHY 120 may be implemented off-chip, while the substantial entirety of otherwise illustrated blocks may be packaged as an SoC. In such configurations, interface 114 may implement a SerDes-type interface with an off-chip PHY 120 and memory controllers (not specifically shown) may provide an interface between off chip portions of memory 102 and one or more levels of on-chip cache. In other embodiments and more generally, portions of computational system 100 may be implemented in or as separate integrated circuits in accord with design, packaging or other requirements.

Focusing now on logical link control (LLC) block 115, various protocol multiplexing and flow mechanisms typical of an OSI model logical link sub-layer implementation are provided. LLC block 115 parses packet headers to extract certain fields (e.g., source addresses, destination addresses, protocols, ports, checksums, etc.) coded therein to facilitate multiplexing of protocols (e.g., IP, IPX, etc.), flow control, as well as detection and control of certain dropped packet errors (e.g., through retransmission). Suitable LLC sub-layer implementations are well known in the art and LLC block 115 includes any of a variety of such implementations. However, in addition, in some embodiments of the present invention, specialized hardware acceleration logic is provided to compute hashes over selected ones of the parsed packet header fields.

Although neither necessary or essential, in some embodiments in accordance with the present invention, selection of a particular subset of fields over which to compute a hash may be accomplished using programmably-defined match rules that evaluate header information in accordance with a decision tree and where certain ones of the match rules further direct a hash generator to include the corresponding field value in a hash computation. More generally, decision logic need not be programmable (or reprogrammable) and the specification of packet header field evaluations and the subset of field values to be included in a hash need not be accomplished using a unified rule framework.

In view of the above, and without limitation, in the illustration of FIG. 1, acceleration logic 130 includes a plurality of logic blocks 131 that seek to apply respective hash-indicating match rules to packet header fields and thereby compute a composite hash over selected field values so identified. In general, the subset of fields over which a hash is to be computed may vary depending on protocol and/or service. For example, for transmission control protocol (TCP) traffic with a destination port for hypertext transfer protocol (HTTP), a desirable hash may be:

hash (IPSA, IPDA, PROT, SP, DP)

where IPSA and IPDA are the IP source and destination address field values, PROT is the protocol field value, and SP and DP are the source and destination port field values, all parsed from the packet header. In contrast, for internet control message protocol (ICMP) traffic, a hash over a different set of field values, e.g., hash (IPSA, IPDA)

may be desirable. For other types of protocol traffic, hashes over still different sets of field values, e.g., hash (MAC_DA, MAC_SA)

may be desirable.

In the illustration of FIG. 1, acceleration logic 130 and associated rule codings in rule store 132 implement field value match criteria, predicate testing and hash computations. To achieve hardware acceleration, multiple instances of logic blocks 131 are provided and individual rule elements that code appropriate matches, masks, predicates and hashes are distributed over logic blocks 131 for evaluation (in parallel) against respective parsed field values. To support high data rates, in some embodiments, a plurality of independently accessible sub-portions of rule store 132 are provided, e.g., as static memory (SRAM) banks individually associated with corresponding ones of the logic blocks 131 and coding therein a respective fractional portion of the overall rule set. Contributions from individual ones of the logic blocks 131 are combined (133) as a hash value for use in connection with the associated packet.

Thus, building on the hash examples above, acceleration logic 130 can be used (given appropriate rules coded in rule store 132) to calculate hashes in a way that allows LLC block 115 to distribute (139) packets amongst a plurality of in-memory queues 105A, 105B . . . 105C in accord with protocol-specific core-affinity workload distributions. For example, in the case of HTTP packet traffic, it can be desirable to distribute processing load across multiple processors 101A, 101B . . . 101C while still ensuring that all packets bearing the same source and destination addresses and ports be routed to a same one of processors (e.g., to processor 101B via queue 105B).

In the illustration of FIG. 1, DMA transfers 197 of at least some packet data target an appropriate one of the in-memory queues 105A, 105B . . . 105C which is selected based on a hash computed over a rule-specified portion of the associated packet header fields. Individual processors access (198) information in a respective one of the in-memory queues (e.g., processor 101B from queue 105B). Thus, core-affinity workload distributions are achieved using hash computations performed by acceleration logic 130 and the evaluation of hash rule elements (in parallel) using the multiplicity logic blocks 131 facilitates high packet rates necessary or desirable to feed higher-layer protocol computations (e.g., network-, transport-, session-, presentation- and/or application-layer protocol computations) performed at processors 101 or elsewhere.

In some embodiments, I/O virtualization techniques may be supported, and fractioning of packet traffic (e.g., based on a multiplicity of virtual communications controllers and associated IP addresses) may also occur. In such cases, additional mappings, e.g., between I/O and host domains and other virtualization-oriented techniques may be supported within communications controller 110 or elsewhere. Based on the description herein, persons of ordinary skill in the art will appreciate suitable virtualization-oriented extensions to communications controller 110; nonetheless, for clarity of descriptive context though without limitation, illustrations and examples herein tend to omit further reference to I/O virtualization.

Finally, in some embodiments, communications controller 110 may include support for a different set of layers (and/or sub-layers) of an implemented protocol stack (or stacks). In this regard, illustrations and examples of allocations of network-, transport-, session-, presentation- and/or application-layer protocol computations to any particular component (e.g., to processors 101) are design-and/or implementation-dependent choices. Based on the description herein persons of ordinary skill in the art will appreciate other design and/or implementations suitable for other allocations of protocol layer/sub-layer computations (including allocations that support additional layers/sub-layers of the protocol computations within communications controller 110 itself, or using some other component(s)). Again, for clarity of descriptive context though without limitation, illustrations and examples herein tend to omit alternative allocations of protocol layer/sub-layer computations.

Match/Hash Rule Set Examples

Much of the description herein will be understood in the context of an evaluation (by communications controller 110) of header fields parsed from a received information frame where the evaluation is consistent with the decision tree and selections of header fields for inclusion in a hash as specified in the following pseudo-code.

```
If IP
    If PROT = ICMP
        HASH{IPSA,IPDA}
    Elseif IP & TCP
        If TCP_dest_port = 80
            HASH{IPSA,IPDA,PROT,SP,DP}
        Elseif TCP_dest_port = 21
            HASH{IPSA,IPDA,PROT}
    Else
        HASH {MAC_DA,MAC_SA}
```

In accord with the forgoing, desired operation of communications controller 110 and any acceleration logic 130 thereof, provides that different hashes are to be computed for:
 a. an ICMP packet;
 b. a packet conveying a TCP segment that codes HTTP traffic;
 c. a packet conveying a TCP segment that codes FTP traffic; or
 d. some non-IP packet.

For at least some encodings of the illustrated pseudo-code as a programmably-defined rule set suitable for evaluation of packet headers (e.g., as match rule entries coded in rule store 132 for concurrent evaluation against parsed header fields using logic blocks 131 of acceleration logic 130), individual rule entries encode masking operations, predicate tests based on specific header field values, and optional selection of selected corresponding field values for inclusion in hash. Thus, in some rule encodings, a set of non-hashed and hashed rule entries such as follows:

```
If (MASK&MATCH {EtherType} = IP)
    If (MASK&MATCH {PROT} = ICMP)
        MASK MATCH&HASH {IPSA}
        MASK MATCH&HASH {IPDA}
    Elseif (MASK&MATCH {PROT} = TCP)
        If (MASK&MATCH {DP} = 80)
            MASK MATCH&HASH {IPSA}
            MASK MATCH&HASH {IPDA}
            MASK MATCH&HASH {PROT}
            MASK MATCH&HASH {SP}
            MASK MATCH&HASH {DP}
        Elseif (MASK&MATCH {DP} = 21)
            MASK MATCH&HASH {IPSA}
            MASK MATCH&HASH {IPDA}
            MASK MATCH&HASH {PROT}
Else
    MASK MATCH&HASH {MAC DA}
    MASK MATCH&HASH {MAC SA}
``` is used to define behavior of a hash generator. Note that by decoupling the order and subset of field value over which a hash is computed from the order in which match rules evaluate header fields to implement an appropriate decision tree, the illustrated set of non-hashed and hashed rule entries allows both an efficient evaluation and coding of decision logic and arbitrary orders (and independently defined) field orders for the selected hash computation.

Filtered Hash Chain Implementation

Figure 2:
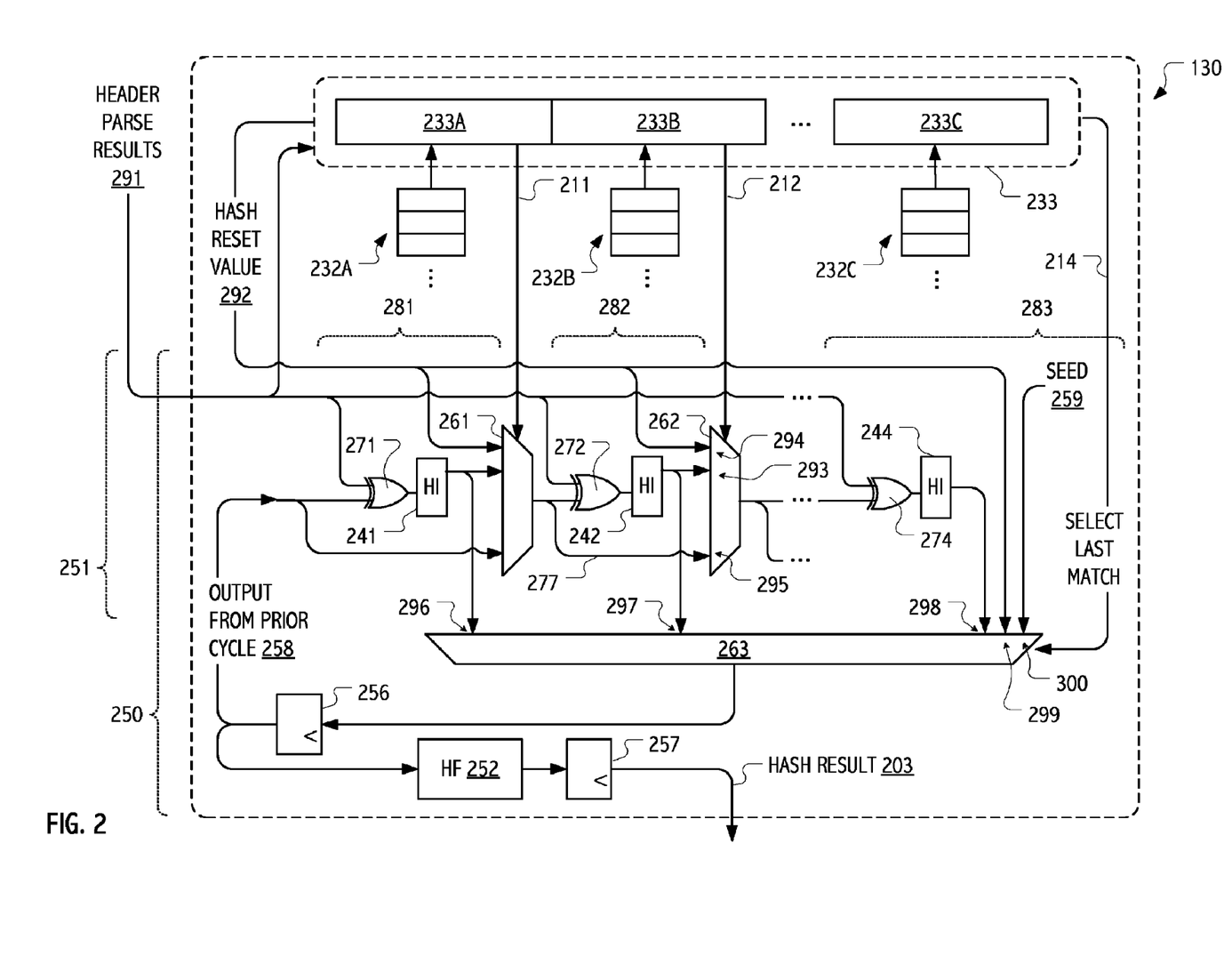
FIG. 2 is a block diagram of a multi-stage, filtered hash chain configured for multi-cycle evaluation of a hash rule set in accordance with some embodiments of the present invention.

FIG. 2 is a block diagram illustrating a hash generator 250 that includes a multi-stage, filtered hash chain 251 configured for use in accordance with some embodiments of the present invention as part of acceleration logic 130. In the illustrated configuration, match rules (including hashed and non-hashed entries) are distributed across a plurality of N SRAM banks 232A, 232B . . . 232C for a multiple (M) cycle evaluation of a rule set coded therein. For simplicity and in accord with the described rule coding, match rules that are indicated as contributing to a hash are sometimes referred to (herein) as hash rules, whereas those not so indicated are sometimes referred to as non-hash rules. As before, individual rule entries code appropriate matches, masks, predicates and/or hashes and are distributed over the memory banks to allow evaluation (in parallel) against fields (e.g., header parse results 291) parsed from a packet header against which the hash rule set is to be applied. In this way, N sub-portions (233A, 233B . . . 233C) of evaluation logic 233 operate to individually (and in parallel) apply a respective indexed rule entry retrieved from a corresponding SRAM bank to header parse results 291. For example, in a first cycle, a first set of indexed rule entries are applied from the respective banks. In a second cycle, a second set of indexed rule entries are applied. In general, successive cycles apply successive sets of indexed rule entries until a total of up to M*N rule entries are applied in M cycles.

In the illustrated configuration, logic that computes the hash is partitioned into two major portions: a filtered hash chain 251 portion and a hash final (HF) portion 252. The filtered hash chain 251 portion selectively introduces hash intermediate (HI) contributions computed in stages 281, 282 . . . 283 based on respective header parse results. In particular, potential hash contributions computed at a given stage (e.g., at HI blocks 241, 242 . . . 244) are selectively introduced into an accumulated hash based on hash rule entry evaluations performed at each stage. In the illustrated configuration, during each cycle, the accumulated hash propagates laterally (downstream) through filtered hash chain 251, accumulating HI contributions (if any) based on then-indexed hash rule entries applied to parsed header fields of a current packet. In anticipation of possible inclusion, each stage XORs (e.g., at logic 271, 272 . . . 274) the applicable parsed header field value (i.e., for the field identified by the currently indexed hash rule entry) with the net accumulated hash value propagated from its upstream neighbor and applies the HI computation to that combined value. Multiple cycles through filtered hash chain 251 are used to selectively introduce HI contributions based on subsequently-indexed hash rule entries applied to parsed header fields of a current packet. Finally, the hash calculation concludes with a calculation (at hash final (HF) portion 252) over accumulated HI contributions introduced in preceding stages and cycles.

Selective introductions of HI contributions depend on the results of a rule entry application at a given stage (e.g., initial stage 281, next stage 282 . . . final stage 283). In general, such results control respective MUX selections (e.g., signals 211, 212) that, for a given stage of filtered hash chain 251:

(i) reset the propagating hash value (using hash reset value 292 supplied from evaluation logic 233),
 (ii) introduce a current stage hash contribution into the accumulated hash value and propagate same downstream, or
 (iii) bypass the current stage HI contribution and instead couple through the prior-stage accumulated hash value.

Hash contributions for possible introduction into the propagating hash value are computed at any given stage based on pertinent field values parsed from the current packet header. For example, in the illustrated embodiment, focusing illustratively on stage 282, a hash value propagating from upstream filtration multiplexer (MUX) 261 is XORed (at 272) with a parsed header field result 291 value corresponding to the hash rule entry applied (in the current cycle) at evaluation logic sub-portion 233B. Hash intermediate (HI) logic 242 computes a hash contribution over the XORed value and supplies the resulting accumulation of prior stage/cycle HI contributions as input 293 to filtration MUX 262.

Depending on the results of the rule entry evaluation (at 233B), MUX select signal 212 directs filtration MUX 262 to select an appropriate one of inputs 293, 294 and 295. For example, if the rule entry applied at evaluation logic 233B is a hash-type rule entry with a matched field value, then select signal 212 directs filtration MUX 262 to propagate the output of HI logic 242 (i.e., the accumulated hash with current stage HI contribution presented at input 294) downstream. If the rule entry applied at evaluation logic 233B is an unmatched (or failed) compound rule entry (e.g., a rule entry that codes an AND conjunction of matches tested by one or more prior stage rule entries), then select signal 212 directs filtration MUX 262 to propagate downstream the hash reset value 292 presented at input 293. If the rule entry applied at evaluation logic 233B is a non-hash type rule entry (e.g., a rule entry that codes a mask setup, predicate evaluation, etc.), then select signal 212 directs filtration MUX 262 to bypass the current stage contribution and simply pass the prior-stage accumulated hash value (e.g., that conveyed via bypass path 277 and presented at input 295) downstream.

After a final stage 283 of filtered hash chain 251, a second-level filtration MUX 263 selects (using select signal 214) a furthest downstream output (e.g., one of filtered hash chain 251 outputs presented at 296, 297 . . . 298) for which a hash-type rule evaluation matched. As before, if evaluation logic (here, evaluation logic 233C) indicates an unmatched (or failed) compound rule entry then select signal 214 directs second-level filtration MUX 263 to propagate hash reset value 292 presented at input 299.

Assuming that a second-level filtration MUX 263 input is selected, it is propagated to latch 256 where, if an additional cycle through filtered hash chain 251 remains, it is available as the prior cycle output 258 for propagation downstream as the prior stage/cycle accumulated hash. In general, successive cycles through filtered hash chain 251 incorporate the accumulated hash value output in the prior cycle. In those cases, where matching hash rules result in a prior cycle contribution to the accumulated hash, the value from the next prior cycle (or seed 259, if applicable) may be recycled using an additional input (not specifically shown) to second-level filtration MUX 263 or simply by retaining the prior cycle output value in latch 256. Note that seed 259 may be introduced for use in a first cycle via second-level filtration MUX 263.

If the accumulated hash value stored in latch 256 is the output of a final cycle through filtered hash chain 251, then the hash calculation concludes with a calculation (at hash final (HF) portion 252) over accumulated HI contributions introduced in preceding stages and cycles. Hash result 203 is latched (at 257) and supplied for use in any appropriate way, including e.g., for use in the previously illustrated core-affinity routing technique.

Partitioned Hash Function Example

In the illustration of FIG. 2, logic that computes a hash over a hash-rule-specified set (and ordering) of packet header field values is partitioned into hash-intermediate and hash-final portions. In general, any of a variety of hash functions may be suitably partitioned into similar portions and used in embodiments such as described herein. Accordingly, the exemplary partition of hash-intermediate and hash-final portions that follow are for purposes of illustration and should not be interpreted as limiting the range of suitable hash functions and partitions thereof that may be employed in embodiments of the present invention. Rather, based on the described partition of hash-intermediate and hash-final portions, persons of ordinary skill in the art will appreciate other suitable overall hash functions and partitions that may be appropriate or desirable in other embodiments or situations.

In view of the foregoing and without limitation, one suitable hash function is a concrete implementation (e.g., in logic) of a mathematical function $ORD(i, j)$. The function $ORD(i, j)$ takes two parameters (i and j) that specify shift amounts. The function $ORD(i, j)$ operates on the implied operand that represents internal state of the hash s. An evaluation of the function $ORD(i, j)$ implemented in silicon operates as a logic cascade and sets the new internal state as follows:

$$s' = s \char`\^ (s<<i) \char`\^ ((s<<j | s<<(i+j)))$$

where negative values for i and j designate a right-shift rather than the otherwise apparent left-shift. In general, the ORD function has been selected after noting that add functions can provide good avalanche/diffusion properties, but may be too slow for some silicon implementations (such as of filtered hash chain 251 described herein) since around four or more cascaded adds could be required each cycle. Persons of ordinary skill in the art may recognize that the ORD( ) function is reminiscent of certain half-adder equations, but with a few changes to increase diffusion. Other hash functions will be apparent to persons of ordinary skill in the art based on the description herein and any applicable design factors.

In any case, a 32-bit ORD( ) based hash function is used in some embodiments of the present invention, e.g., to hash IPv6 source and destination address values parsed from packet headers and thereby maintain core-affinity in a communications controller design such as previously illustrated. For purposes of illustration, hash-intermediate (HI) and hash-final (HF) portions of the 32-bit ORD( ) based hash function will be understood as follows. HI logic instances, e.g., HI logic 241, 242 . . . 244, are silicon logic implementations of the following:

```
hash-intermediate( ) {
    s = ORD(1,6);
    s = ORD(-14,-3);
    s = rotate(s,11);
}
```

Correspondingly (and again relative to FIG. 2 and in accord with some embodiments of the present invention), HF logic 252 is a silicon logic implementation of the following:

```
hash-final( ) {
    hash-intermediate( );
    hash-intermediate( );
    hash-intermediate( );
}
```

Notwithstanding the foregoing detail, particular hash functions and particular partitions thereof into hash-intermediate and hash-final portions are purely illustrative and should not be interpreted as limiting the range of suitable hash functions and/or partitions thereof that may be employed in embodiments of the present invention.

Filtered Hash Chain, Multi-Cycle Example

Figure 3:
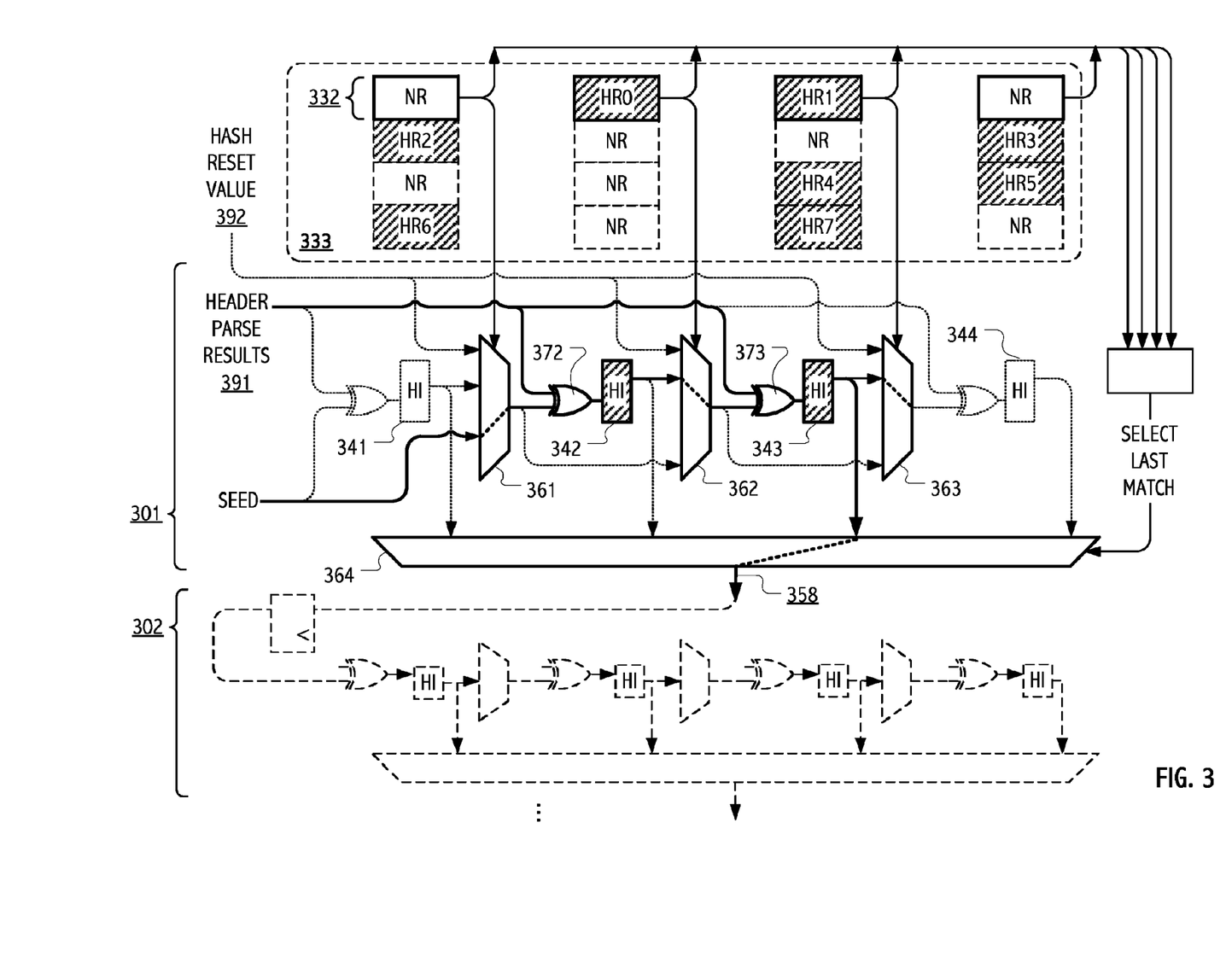
FIG. 3 depicts flows in accordance with a first of four (4) cycles through an illustrative 4-stage filtered hash chain in accordance with some embodiments of the present invention.

Building on the forgoing description, FIG. 3 depicts flows through an illustrative 4-stage filtered hash chain in accordance with some embodiments of the present invention. In particular, FIG. 3 provides a working example for a first of four (4) cycles through a 4-stage filtered hash chain implementation patterned on that described above with reference to FIG. 2. An illustrative set of hash rule entries are distributed across four SRAM banks that together constitute a rule set and which cause evaluation logic 333 to perform packet header field match and hash operations. Those rule entries include two hash rule entries HR0 and HR1 that appear in a first indexed position 332 within respective banks and six additional hash rule entries (HR2, HR3, HR4, HR5, HR6, and HR7) that appear in respective subsequent indexed positions within respective banks. Non-hash rules NR are also illustrated and appear in respective indexed positions within respective banks.

More particularly, FIG. 3 illustrates first cycle 301 flows through a 4-stage embodiment of the previously described filtered hash chain based on an illustrated rule subsequence {NR, HR0, HR1, NR} distributed across the first indexed position 332A of the respective banks. Because the first indexed position of the bank associated with the initial stage of the illustrated hash chain (recall stage 281, FIG. 2) codes a non-hash rule, hash-intermediate computations (if any) by HI logic 341 are not propagated downstream. Rather, an input sourced from a bypass path (here coding the initial hash seed) is selected by filtration MUX 361 and supplied for downstream use in the next stage.

The first indexed position of the bank associated with the second stage of the illustrated hash chain codes a hash rule (i.e., hash rule HR0) that, for purposes of illustration, we assume matches the corresponding field value parsed from the packet header. Accordingly, that matched field value is combined with the output of the prior stage using XOR 372 and supplied to HI logic 342 for use in a hash-intermediate computation, the results of which are passed through filtration MUX 362 based on a select signal appropriate the matched hash rule. Contents of the first indexed position of the bank associated with the third stage also code a hash rule (i.e., hash rule HR1) that, again for purposes of illustration, we assume matches the corresponding field value parsed from the packet header. Accordingly, that matched field value is combined with the output of the prior stage using XOR 373 and supplied to HI logic 343 for use in a hash-intermediate computation, the results of which are passed through filtration MUX 363 based on a select signal appropriate to the matched hash rule.

Because the first indexed position of the bank associated with the fourth stage codes a non-hash rule, the last hash rule match (during this cycle) is in the third stage and accordingly a select signal directs second-level filtration MUX 364 to couple through the corresponding input and supply the accumulated hash value as output 358 for using in a next cycle 302 through the filtered hash chain. That next cycle 302 is illustrated in greater detail in FIG. 4.

Figure 4:
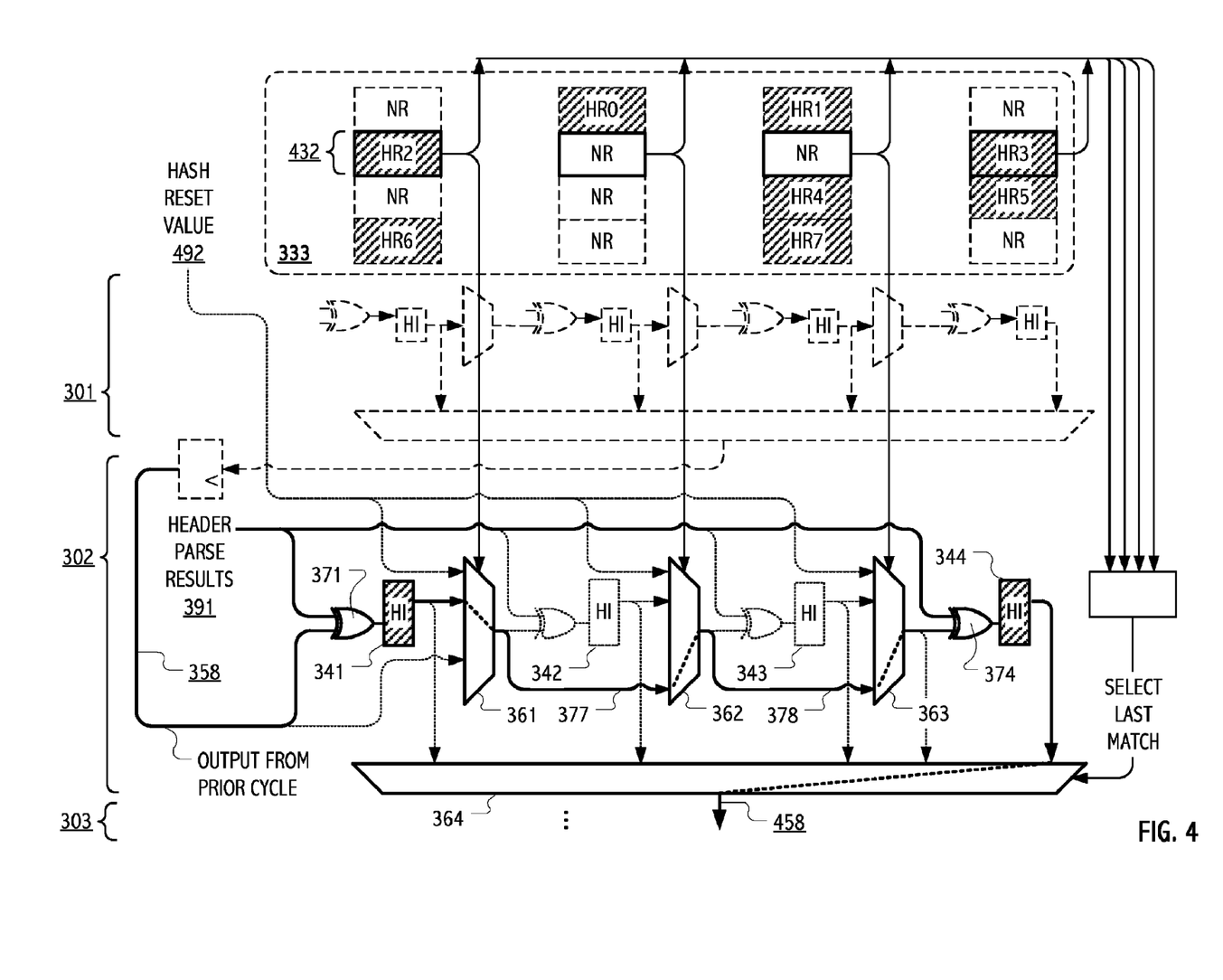
FIG. 4 illustrates flows in accordance with a second of four (4) cycles through an illustrative 4-stage filtered hash chain in accordance with some embodiments of the present invention.

Building on the foregoing, FIG. 4 illustrates second cycle 302 flows through the 4-stage embodiment of the previously described filtered hash chain based on an illustrated rule subsequence {HR2, NR, NR, HR3} distributed across the second indexed position 432 of the respective banks. The second indexed position of the bank associated with the initial stage of the illustrated hash chain codes a hash rule (i.e., hash rule HR2) that, for purposes of illustration, we assume matches the corresponding field value parsed from the packet header. Accordingly, that matched field value is combined with output 358 of prior cycle 301 using XOR 371 and is supplied to HI logic 341 for use in a hash-intermediate computation, the results of which are passed through filtration MUX 361 based on a select signal appropriate to the matched hash rule. Because the second indexed position of the bank associated with the second stage of the illustrated hash chain codes a non-hash rule, hash-intermediate computations (if any) by HI logic 342 are not propagated downstream. Rather, an input sourced from bypass path 377 (here coding the hash accumulated through the prior stage) is selected by filtration MUX 362 and supplied for downstream use in the next stage.

Again in the third stage of the illustrated hash chain, the corresponding second indexed position in the associated bank codes a non-hash rule and, accordingly, hash-intermediate computations (if any) by HI logic 343 are not propagated downstream. Rather, an input sourced from bypass path 378 is selected by filtration MUX 363 and is supplied for possible downstream use in the fourth stage. Since the second indexed position of the bank associated with the fourth stage of the illustrated hash chain codes a hash rule (i.e., hash rule HR3) and since, for purposes of illustration, we again assume that the hash rule matches the corresponding field value parsed from the packet header, the matched field value is combined with the output of prior stage filtration MUX 363 using XOR 374 and supplied to HI logic 344 for use in a hash-intermediate computation, the results of which are passed through second-level filtration MUX 364 based on a signal selective for the accumulated hash output of the stage (here the fourth stage) containing the last hash rule match during this second cycle 302. Second-level filtration MUX 364 couples through the corresponding input and supplies it as output 458 for using in a next cycle 303 through the filtered hash chain.

Figure 5:
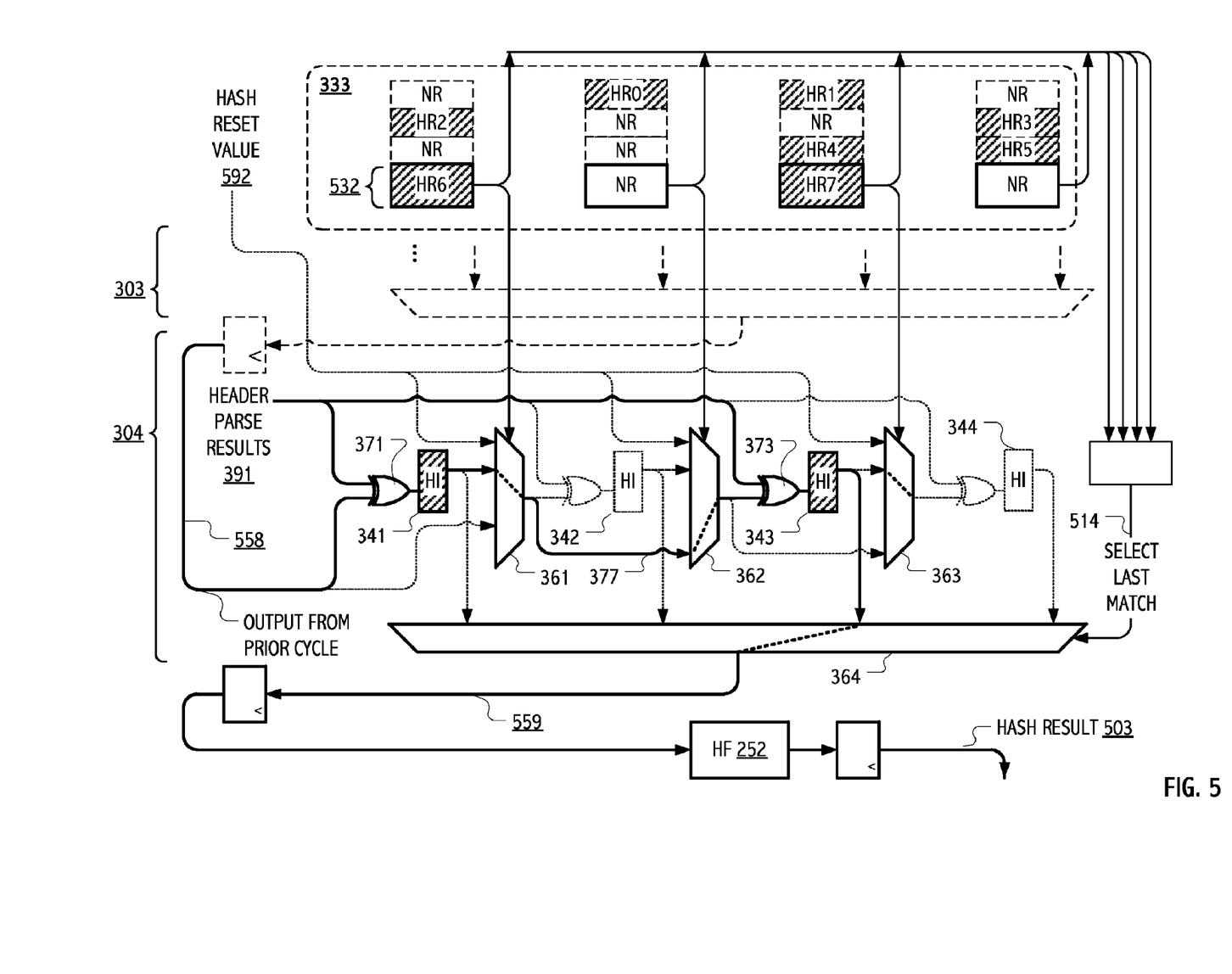
FIG. 5 illustrates flows in accordance with a final one of four (4) cycles and through an illustrative 4-stage filtered hash chain together with a final hash through in accordance with some embodiments of the present invention.

Skipping ahead, FIG. 5 illustrates flows during a fourth and final cycle 304 through the 4-stage embodiment of the previously described filtered hash chain based on an illustrated rule subsequence {HR6, NR, HR7, NR} distributed across the fourth indexed position 532 of the respective banks. The fourth indexed position of the bank associated with the initial stage of the illustrated hash chain codes a hash rule (i.e., hash rule HR6) that, for purposes of illustration, we assume matches the corresponding field value parsed from the packet header. Accordingly, that matched field value is combined with output 558 of prior cycle 303 using XOR 371 and supplied to HI logic 341 for use in a hash-intermediate computation, the results of which are passed through filtration MUX 361 based on a select signal appropriate to the matched hash rule. Because the fourth indexed position of the bank associated with the second stage of the illustrated hash chain codes a non-hash rule, hash-intermediate computations (if any) by HI logic 342 are not propagated downstream. Rather, an input sourced from bypass path 377 (here coding the hash accumulated through the prior stage) is selected by filtration MUX 362 and supplied for downstream use in the next stage.

Contents of the fourth indexed position of the bank associated with the third stage also code a hash rule (i.e., hash rule HR7) that, for purposes of illustration, we again assume matches the corresponding field value parsed from the packet header. Accordingly, that matched field value is combined with the output of the prior stage using XOR 373 and supplied to HI logic 343 for use in a hash-intermediate computation, the results of which are passed through filtration MUX 363 based on a select signal appropriate for the matched hash rule.

Because the fourth indexed position of the bank associated with the fourth stage codes a non-hash rule, the last hash rule match (during this fourth and final cycle through the filtered hash chain) is in the third stage and accordingly select signal 514 directs second-level filtration MUX 364 to couple through the corresponding input and supply it as output 559. Output 559 is passed to hash final (HF) logic 252, which in turn supplies hash result 503 encoding the hash contributions accumulated based on four cycles through filtered hash chain and evaluation (by evaluation logic 333) of hash rules {HR0, HR1, HR2, HR3, HR4, HR5, HR6, HR7} against respective field values parsed from a current packet header.

Figure 6A:
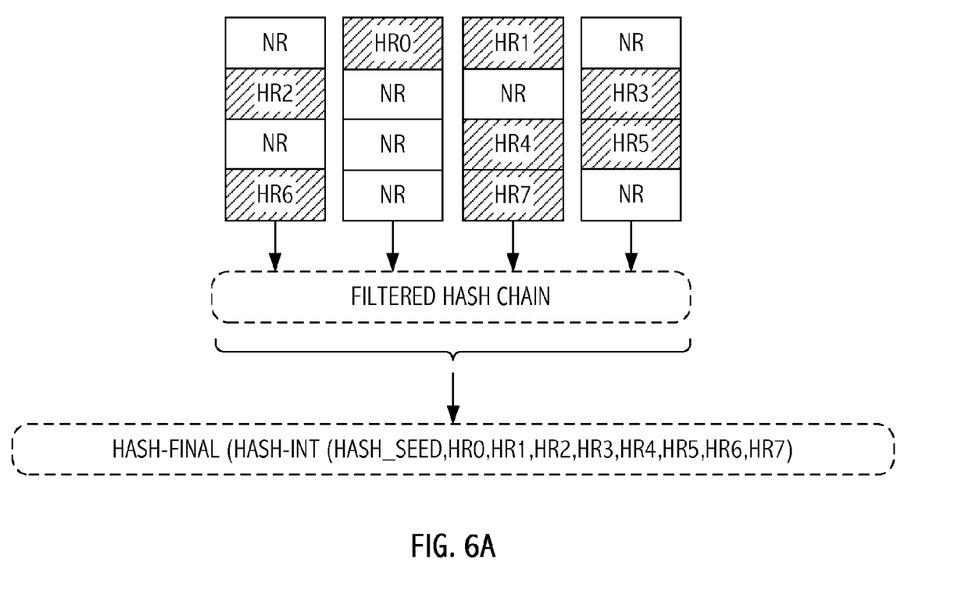
FIGS. 6A and 6B illustrate, in accordance with some embodiments of the present invention, corresponding in-memory footprints for rule sequences that produce a consistent hash despite dissimilar allocations of individual hash rules to memory banks.
Figure 6B:
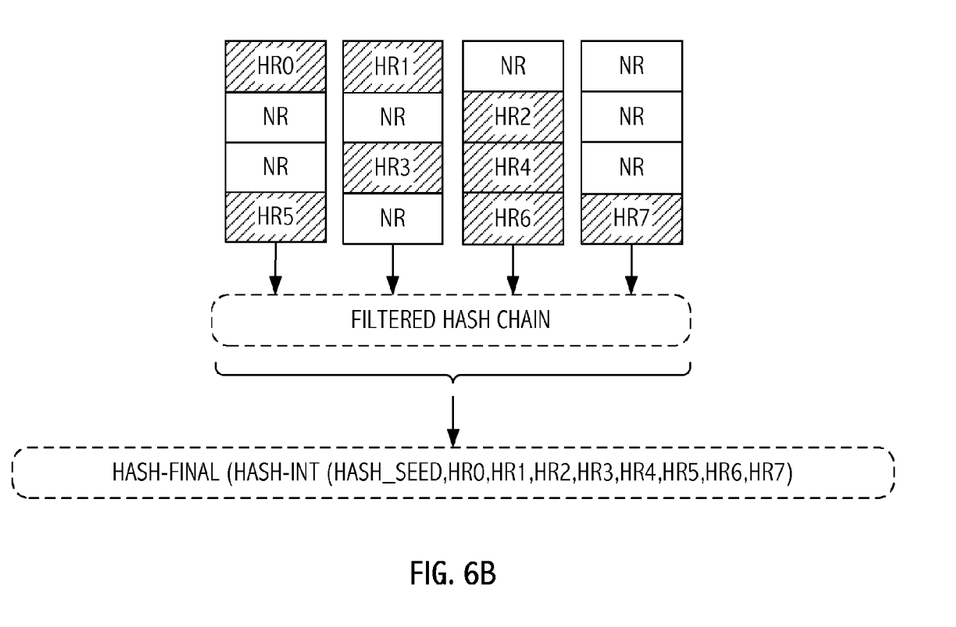

FIGS. 6A and 6B illustrate, in accordance with some embodiments of the present invention, corresponding in-memory footprints for rule sequences that produce a consistent hash despite dissimilar allocations of individual hash rule entries to memory banks. Successive cycles through a 4-stage filtered hash chain with an in-memory allocation of rule entries to banks consistent with FIG. 6A was illustrated and described above with reference to FIGS. 3-5. Based on the description herein, persons of ordinary skill in the art will appreciate that, despite the different allocation of rule entries to banks in FIG. 6B, propagation of hash intermediate contributions in successive cycles through the 4-stage filtered hash chain described above results in an identical hash.

Other Embodiments

Although the invention is described herein with reference to specific embodiments, various modifications and changes can be made without departing from the scope of the present invention as set forth in the claims below. For example, while techniques have been described in the context of particular communication controller configurations and hashes of packet header field values, the described techniques have broad applicability to other rule evaluation and hash generation designs in which insensitivity to allocation of hash rules to particular storage and/or evaluation units is desirable. Similarly, although the techniques have been described in the context of multi-cycle evaluations through a comparatively short (4-stage) filtered hash chain, in some embodiments gate delays associated with a longer filtered hash chain may be tolerable and fewer cycles, perhaps even a single cycle, through such a filtered hash chain may be consistent with design objectives.

Embodiments of the present invention may be implemented using any of a variety of different hash functions, processing architectures and logic families and may employ hash generation for any of a variety of different purposes, including core-affinity packet traffic routing, load balance, etc. Accordingly, while FIG. 1 together with its accompanying description relates to an exemplary multiprocessor-or multicore-type information processing architecture in which core-affinity is a design goal, the exemplary architecture is merely illustrative. Of course, architectural descriptions herein have been simplified for purposes of discussion and those skilled in the art will recognize that illustrated boundaries between logic blocks or components are merely illustrative and that alternative embodiments may merge logic blocks or circuit elements and/or impose an alternate decomposition of functionality upon various logic blocks or circuit elements.

Articles, systems and apparati that implement the present invention are, for the most part, composed of electronic components, circuits, rule entries and/or code (e.g., software, firmware and/or microcode) known to those skilled in the art and functionally described herein. Accordingly, component, circuit and code details are explained at a level of detail necessary for clarity, for concreteness and to facilitate an understanding and appreciation of the underlying concepts of the present invention. In some cases, a generalized description of features, structures, components or implementation techniques known in the art is used so as to avoid obfuscation or distraction from the teachings of the present invention.

Finally, the specification and figures are to be regarded in an illustrative rather than a restrictive sense, and consistent with the description herein, a broad range of variations, modifications and extensions are envisioned. Any benefits, advantages, or solutions to problems that are described herein with regard to specific embodiments are not intended to be construed as a critical, required, or essential feature or element of any or all the claims.

What is claimed is:

1. An apparatus comprising:
matching logic configured to concurrently evaluate packet header information against respective entries of a rule set coded in storage; and a hash generator for calculating a hash result relative to the evaluated packet information, the hash generator including intermediate and final portions and a filtration stage coupled therebetween, wherein the intermediate portion is configured as a chain of hash-intermediate stages each coupled to calculate a rule entry evaluation-specific contribution for possible inclusion in the hash and, for lower-order ones of the hash-intermediate stages, for possible propagation down chain and inclusion in a next higher-order hash-intermediate stage contribution, and wherein the filtration stage is selective for a rule entry-specific contribution from a particular one of the hash-intermediate stages for supply to the final portion for use in completing calculation of the hash result.

2. The apparatus of claim 1, further comprising:
the storage, wherein the storage is implemented as plural banks of memory and wherein each of the concurrently evaluated against rule entries is accessed from a different one of the plural banks.

3. The apparatus of claim 1, further comprising:
first-level filtration stages coupled between the hash-intermediate stages of the chain, the first-level filtration stages selectively coupling respective values down chain for possible inclusion in the hash.

4. The apparatus of claim 3,
wherein, for a particular one of the first-level filtration stages, the value coupled down chain is selected, based on a corresponding evaluation by the matching logic, from a set of values that includes:
a rule entry-specific contribution from an immediately preceding hash-intermediate stage; and
an intermediate output from a previous cycle.

5. The apparatus of claim 3,
wherein the matching logic is coupled to supply selection control signals to respective ones of the first-level filtration stages.

6. The apparatus of claim 3,
wherein for individual ones the first-level filtration stages, selection of a contribution from the immediately preceding hash-intermediate stage for coupling down chain is based on a match-type evaluation of the match logic in accord with a corresponding hash-enabled one of the rule entries.

7. The apparatus of claim 3,
wherein the selected-from set of values further includes a hash reset value, and
wherein for individual ones the first-level filtration stages, selection of the hash reset value for coupling down chain is based on a fail-type evaluation of the match logic in accord with a compound set of the rule entries.

8. The apparatus of claim 7, wherein the compound set includes one or more of:
an AND chain of rule entries; and
a cluster of rule entries.

9. The apparatus of claim 1,
configured for multi-cycle operation whereby the packet header information is evaluated, in one or more successive cycles, against additional rule entries from the rule base; and
further comprising a recycle path coupled from output the filtration stage back to the hash-intermediate stage for possible selection in a next cycle.

10. The apparatus of claim 9,
wherein upon completion and accumulation of an intermediate output that includes contribution from plural successive cycles and hash-intermediate stages thereof, the intermediate output is supplied to the final portion for use in the completing of the hash result calculating.

11. The apparatus of claim 1,
wherein the filtration stage is further selective amongst outputs of the hash-intermediate stages, a hash reset value, and a prior cycle intermediate output.

12. The apparatus of claim 1,
wherein the hash generator is implemented as multi-level logic and partitioned such that one or more initial levels thereof are replicated at each of the plural hash-intermediate stages of the intermediate portion and remaining levels thereof implement the final portion.

13. The apparatus of claim 1, further comprising:
plural processing resources,
wherein the hash generator is coupled to supply a load balancer with the hash result and thereby distribute packets to the plural processing resources.

14. The apparatus of claim 1,
configured as a communications controller in which the hash result is employed to maintain a core affinity routing of packet traffic.

15. A method of generating a hash in correspondence with evaluation of packet header information against constituent rule entries of a rule base, the method comprising:
concurrently performing plural evaluations of the packet header information against respective ones of the rule entries retrieved from storage;
calculating the hash relative to the evaluated packet information using logic partitioned into intermediate and final portions, wherein the intermediate portion of the hash calculating is performed using a chain of stages each coupled to supply a rule entry evaluation-specific contribution for possible inclusion in the hash and, for lower-order ones of the stages, to selectively propagate down chain a rule entry evaluation-specific contribution for possible inclusion in a next higher-order stage contribution, and
filtering the rule entry evaluation-specific contributions to select a particular one for supply to the final portion of the hash calculating.

16. The method of claim 15,
wherein the storage includes plural banks of memory, and further comprising accessing each of the concurrently evaluated against rule entries from a different one of the plural banks.

17. The method of claim 15,
performing first-level filtering between the stages of the chain, the first-level filtering selectively coupling respective values down chain for possible inclusion in the hash.

18. The method of claim 15, wherein, for particular ones of the first-level filterings, the value coupled down chain is:
for a match-type evaluation of a hash-enabled rule, a rule entry-specific contribution from an immediately preceding stage; and
for a fail-type evaluation of a hash-enabled rule, a hash reset value.

19. The method of claim 15, further comprising:
repeating, relative first to an initial subset of the rule entries and thereafter for subsequent subsets thereof, both the concurrent evaluations of packet header information and the intermediate portion of the hash calculating, and
performing for each repetition of the intermediate portion of the hash calculating, second-level filtering to select a particular one of the rule entry evaluation-specific contributions for possible inclusion in the hash, wherein for an initial and successive non-final performances of the second-level filtering, the selected rule entry evaluation-specific contributions are fed back for inclusion in a next repeat of the intermediate portion of the hash calculating, and wherein a final performance of the second-level filtering constitutes the filtering to select a particular rule entry evaluation-specific contribution for supply to the final portion of the hash calculating.

20. An apparatus comprising:

means for concurrently performing plural evaluations of the packet header information against respective ones of the rule entries retrieved from storage;

means for calculating the hash relative to the evaluated packet information using logic partitioned into intermediate and final portions, wherein the intermediate portion of the hash calculating is performed using a chain of stages each coupled to supply a rule entry evaluation-specific contribution for possible inclusion in the hash and, for lower-order ones of the stages, to selectively propagate down chain a rule entry evaluation-specific contribution for possible inclusion in a next higher-order stage contribution;

means for filtering the rule entry evaluation-specific contributions to select a particular one for supply to the final portion of the hash calculating; and means for repeating, relative first to an initial subset of the rule entries and thereafter for subsequent subsets thereof, both the concurrent evaluations of packet header information and the intermediate portion of the hash calculating.

* * * * *